United States Patent [19]

Wenz

[11] Patent Number: 4,661,731
[45] Date of Patent: Apr. 28, 1987

[54] SHIELD FOR FAN MOTOR FOR REDUCING STRUCTUREBORNE NOISE AND THE EXTERNAL MAGNETIC FIELD

[75] Inventor: Charles F. Wenz, St. Paul, Minn.

[73] Assignee: Sperry Corporation, Blue Bell, Pa.

[21] Appl. No.: 855,576

[22] Filed: Apr. 25, 1986

[51] Int. Cl.$^4$ .............................................. H02K 5/24
[52] U.S. Cl. ........................................ 310/51; 310/89
[58] Field of Search ....................... 310/51, 85, 89, 91, 310/52, 46–48; 98/43 R

[56] References Cited

U.S. PATENT DOCUMENTS

| 3,500,083 | 3/1970 | Dochterman | 310/51 |
| 3,527,969 | 9/1970 | Papst | 310/51 |
| 3,546,504 | 12/1970 | Janssen et al. | 310/51 |
| 4,171,937 | 10/1979 | Greenfield | 310/51 X |
| 4,499,391 | 2/1985 | Sakamoto | 310/51 X |

FOREIGN PATENT DOCUMENTS 0099241 6/1983 Japan ..................................... 310/51

Primary Examiner—Mark O. Budd
Attorney, Agent, or Firm—Glenn W. Bowen

[57] ABSTRACT

A tubeaxial type electrical cooling fan is constructed with two or more fan struts that extend across the open back of the fan to a circular support ring that supports the shaft of the motor, which in turn supports the fan blades. In such a structure, bending or flexing can occur in the fan struts which generate and transmit structureborne noise. In addition, these types of motors have a higher than desirable external magnetic field and noise may be generated by the bearings in the motor or in the resonance of other structural numbers. A nickel-iron shield is provided that fits over the supporting hub and the radial fan struts. An intermediate sound damping adhesive layer between the struts and the shield provides both a magnetic flux shielding and vibration damping of the structureborne noise.

1 Claim, 5 Drawing Figures

SHIELD FOR FAN MOTOR FOR REDUCING STRUCTUREBORNE NOISE AND THE EXTERNAL MAGNETIC FIELD

The U.S. Government has a paid-up license in this invention and the right in limited circumstances to require the patent owner to license others on reasonable terms as provided for by the terms of contract No. N00024-80-D-7158 awarded by the Navy.

FIELD OF THE INVENTION

Electric motor driven cooling fans are commonly required to reduce heat in electronic equipment. This invention relates to an improved structure for reducing both the structureborne noise and the external magnetic field associated with a cooling fan.

BACKGROUND OF THE INVENTION

A common type of electrical cooling fan for electronic equipment is the tubeaxial fan type, which is often relatively wide and flat in shape. This type of fan is conventionally constructed with two or more fan struts that extend across the open back of the fan between a circular support ring and the motor housing that supports the shaft of the motor, which in turn supports the fan blades. Commonly the fan struts, the ring and the motor housing are all integrally formed of a single piece that forms the rear portion of the fan and motor assembly.

Prior to the present invention it was known that bending or flexing could occur in the fan struts which would generate and transmit structureborne noise. At the same time many of these types of motor fan assemblies have a higher than desirable external magnetic field. In addition to the bending of the struts themselves, noise may be generated in the bearings, in the motor and in the resonance of other structural paths or by rotational noise and other factors.

Vibration damping adhesive material for general purpose use is formulated by a number of different suppliers. For example, the Soundcoat Company, Inc. of Deer Park, NY, provides a damping adhesive which they designate as N5. With a backing layer the designation is N5-E. This adhesive may be employed for sound damping purposes. Other suitable adhesives may be obtained from 3M Company of St. Paul, MN, which are viscoelastic polymers that are sold under the designations 468 and SJ2015X. Suitable damping adhesives sold by other manufacturers, may also be employed in conjunction with the present invention.

The present invention provides a unique structure which is formed of nickel-iron shield that fits over the supporting hub and the radial fan struts of a tubeaxial fan with an intermediate vibration damping layer of the type mentioned above, being provided between the struts and the shield. This structure provides both magnetic flux shielding and constrained-layer vibration damping for reduction of structureborne noise.

DESCRIPTION OF THE DRAWINGS

The present invention is described by reference to the drawings in which.

DESCRIPTION OF THE INVENTION

Figure 1:
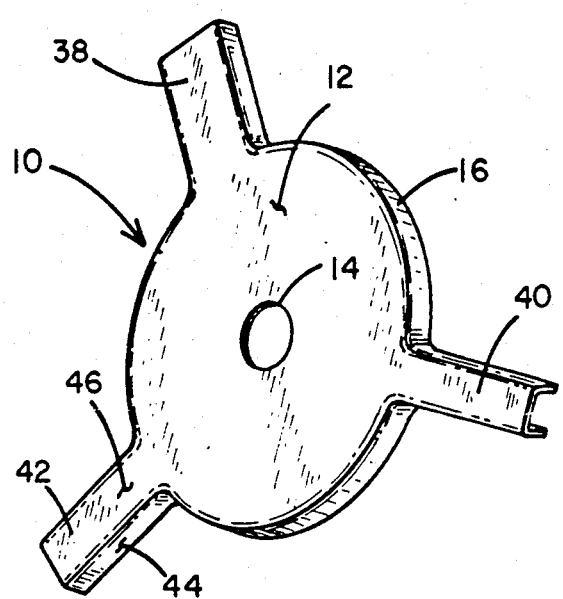
FIG. 1 is a perspective view of the shield employed in the present invention.
Figure 2:
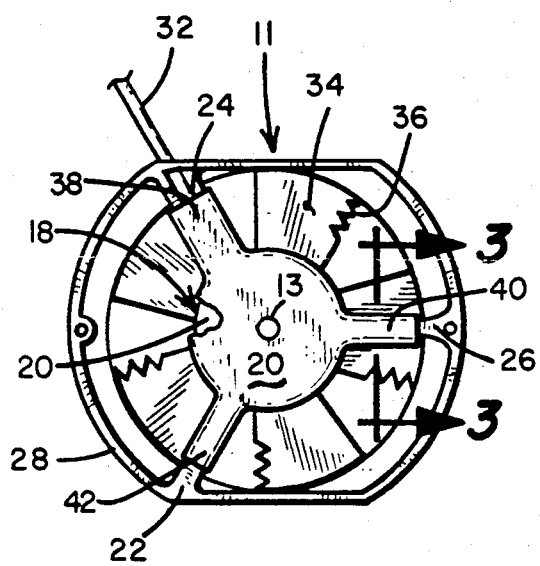
FIG. 2 is a view looking at the back of the tubeaxial fan motor with the shield of FIG. 1 secured to the radial fan struts.

The shield 10 of the present invention, which is applied to a motor and fan assembly 11 to reduce the external magnetic field and the structureborne noise, is shown in FIG. 1. The shield 10 is preferably formed of nickel-iron, and is shaped with cylindrical inner hub 12 that has a centrally located aperture 14 which accesses the end of the motor shaft 13. The hub 12 is formed with a rim 16 that projects towards the housing 18 of the motor (FIG. 2). The hub 12 and rim 16 fit over corresponding end plate 20 and a portion of housing motor 18. Three radial extending struts 22, 24 and 26 of the motor housing with the end plate 20 extend outwardly where they join the outer shell of the frame 28. The end plate 20 thus supports the shaft 13 in the center of the motor housing. An electrical power cord 32 is supplied through an opening in the strut 24, which is slightly wider than the struts 22 and 26 to accommodate the power cord. The motor (not shown) supports a number of fan blades 34 which have serrated edges on their trailing edge 36 to reduce fan noise.

The shield 10 has U-shaped radial arms 38, 40 and 42 which are positioned and sized so the sidewalls 44 of these arms project over the sides of the corresponding struts 22, 24 and 26. The arm 38 is wider than the arms 40 and 42 to allow it to fit over the wider strut 24. The top surfaces 46 of the arms 38, 40 and 42 are substantially parallel to the upper surfaces 48 of the struts. The sidewalls 44, therefore, lie substantially parallel to the sides 50 of the struts, as can best be seen in FIG. 3. The nickel-iron shield 10 is preferably constructed of stock which is on the order of 0.020 inches to 0.050 inches in order to provide a reasonable range of rigidity and elasticity. A vibration damping adhesive layer such as the aforementioned Soundcoat Company Inc. or the 3M adhesive materials are utilized to provide the vibration damping layer 52.

The vibration damping layer 52 is preferably on the order of 0.005 inches thick and is used with a thin backing layer of polymeric material such as the layer 54 which is on the order of 0.002 inches thick. The vibration damping layer is conveniently supplied with the backing layer so that it may be cut into a pattern that fits over the end plate 20 and struts 38, 40, and 42, and thus the shield may be placed over the end plate 20 of the motor housing and the adhered damping layer together.

Figure 3:
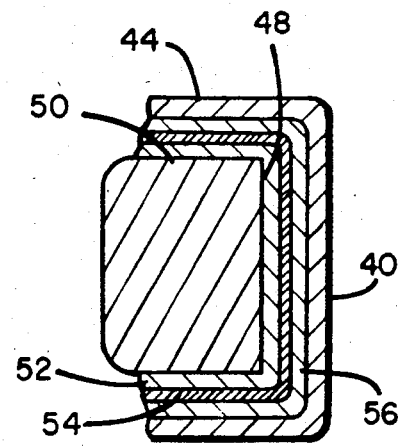
FIG. 3 is a cross-sectional view taken along the lines 3—3 of FIG. 2, which shows a portion of a radial fan strut, the outer shield, a vibration damping adhesive layer, a backing layer for the sound damping adhesive layer and an epoxy filler layer.

It is also necessary to include a second adhesive layer which may be a two part epoxy material consisting of an epoxy resin base and a modified amine hardener which is sold under the 3M vendor number 2216. This material acts to fill voids and secure the shield to the damping layer backing 54, as shown in FIG. 3. Layer 56 may be considerably thicker than the 52, for example it may be on the order of 0.005 to 0.020 inches thick.

Figure 4:
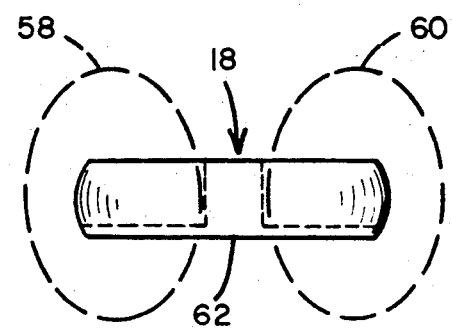
FIG. 4 represents the magnetic flux field around the tubeaxial fan without the shield of FIG. 1 attached.
Figure 5:
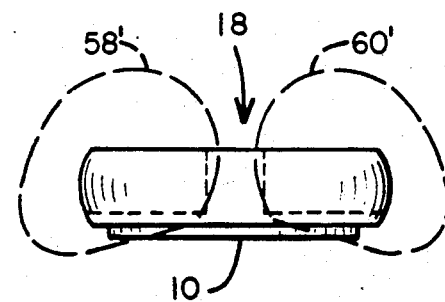
FIG. 5 represents the magnetic field with the shield of FIG. 1 secured in place.

The structure described so far serves to considerably reduce the structureborne noise of the described motor and fan assembly. FIG. 4 illustrates the magnetic flux fields that exist around the fan 11 when the shield 10 is not applied. The dotted paths 58 and 60 represent the associated magnetic flux fields which extend from the back 62 of the fan into electronic equipment that is positioned adjacent the fan and may be adversely affected by stray magnetic effects. By placing the shield 10 on the fan motor assembly as shown in FIG. 2, the flux lines are modified so they appear as represented by the paths 58' and 60' as shown in FIG. 5, which shows how the shield 10 also appreciably reduces the influence of the external magnetic field from the fan motor assembly on electronic equipment.

What is claimed is:

1. A shield for a fan motor assembly having a plurality of struts which join to an end plate that supports the motor shaft of the fan, the improvement comprising a shield of an electrically conductive material which is shaped to conform to the end plate and to the struts so as to fit partially over said elements, a vibration damping adhesive interspersed between said end plate and said struts over substantially the entire surface thereof, and adhesive means for securing said shield and said vibration damping layer to said end plate and said struts, wherein the flexural rigidity of said shield and the damping properties of said adhesive are controlled to reduce the propagation of structureborne noise by said end plate and struts.

* * * * *